(12) United States Patent
Wettergren

(10) Patent No.: US 7,290,284 B1
(45) Date of Patent: Oct. 30, 2007

(54) SYSTEM FOR DATA PROCESSING A SECURITY CRITICAL ACTIVITY

(75) Inventor: Christian Wettergren, Stockholm (SE)

(73) Assignee: Myspace AB, Stockholm (SE)

( * ) Notice: Subject to any disclaimer, the term of this patent is extended or adjusted under 35 U.S.C. 154(b) by 0 days.

(21) Appl. No.: 09/889,126

(22) PCT Filed: Jan. 10, 2000

(86) PCT No.: PCT/SE00/00027

§ 371 (c)(1),
(2), (4) Date: Jul. 11, 2001

(87) PCT Pub. No.: WO00/42490

PCT Pub. Date: Jul. 20, 2000

Related U.S. Application Data

(60) Provisional application No. 60/115,488, filed on Jan. 11, 1999.

(30) Foreign Application Priority Data

Jan. 11, 1999   (SE)   .................................... 9900051

(51) Int. Cl.
  G06F 12/14 (2006.01)
  G06F 13/12 (2006.01)
  G06F 9/00 (2006.01)
  G11C 7/00 (2006.01)
  G06F 17/00 (2006.01)

(52) U.S. Cl. .......................... 726/27; 726/16; 713/193; 711/163

(58) Field of Classification Search ................ 713/200, 713/193; 711/163; 726/27, 16
See application file for complete search history.

(56) References Cited

U.S. PATENT DOCUMENTS

| | | | |
|---|---|---|---|
| 4,685,056 A | | 8/1987 | Barnsdale, Jr. et al. |
| 4,937,736 A | * | 6/1990 | Chang et al. ................ 711/208 |
| 5,263,147 A | * | 11/1993 | Francisco et al. ........... 711/164 |
| 5,343,524 A | | 8/1994 | Mu et al. |
| 5,406,624 A | * | 4/1995 | Tulpan ........................ 713/192 |

(Continued)

FOREIGN PATENT DOCUMENTS

EP    0 171 456    2/1986

OTHER PUBLICATIONS

Yeung et al. "MGS: A Multigrain Shared Memory System" 23rd Annual International Symposium on Computer Architecture, May 1996, pp. 1-12.*

*Primary Examiner*—Christopher Revak
*Assistant Examiner*—Matthew T Henning
(74) *Attorney, Agent, or Firm*—Young & Thompson

(57) ABSTRACT

A system for data processing a security critical activity in a secure management mode in a computer, which comprises a processor (10), handling devices (20, 28-38), memory storage resources (14, 42). The system comprises a security device (50) comprising a processor (52) and signal generators ($SG_{PM}$, $SG_A$), a number of control switches (60), with signal receivers ($SR_A$, $SR_{PM}$) arranged respectively between the security device and the pre-selected resources. The switches contain information regarding accessibility to and from the resources, or parts of the resources, hereafter named resource ranges, wherein the switch controls requests from the computer processor to the resources or resource ranges depending on the information contained in the switch, and wherein, in response to a call from the computer processor or the handling devices, the switches are activated by receiving a signal ($SG_{PM}$) from the security device, enabling the security device access to and from the resources or resource ranges selected by the security device, and denying the computer processor access to and from the resources or resource ranges selected by the security device.

16 Claims, 5 Drawing Sheets

U.S. PATENT DOCUMENTS

Figure 1:
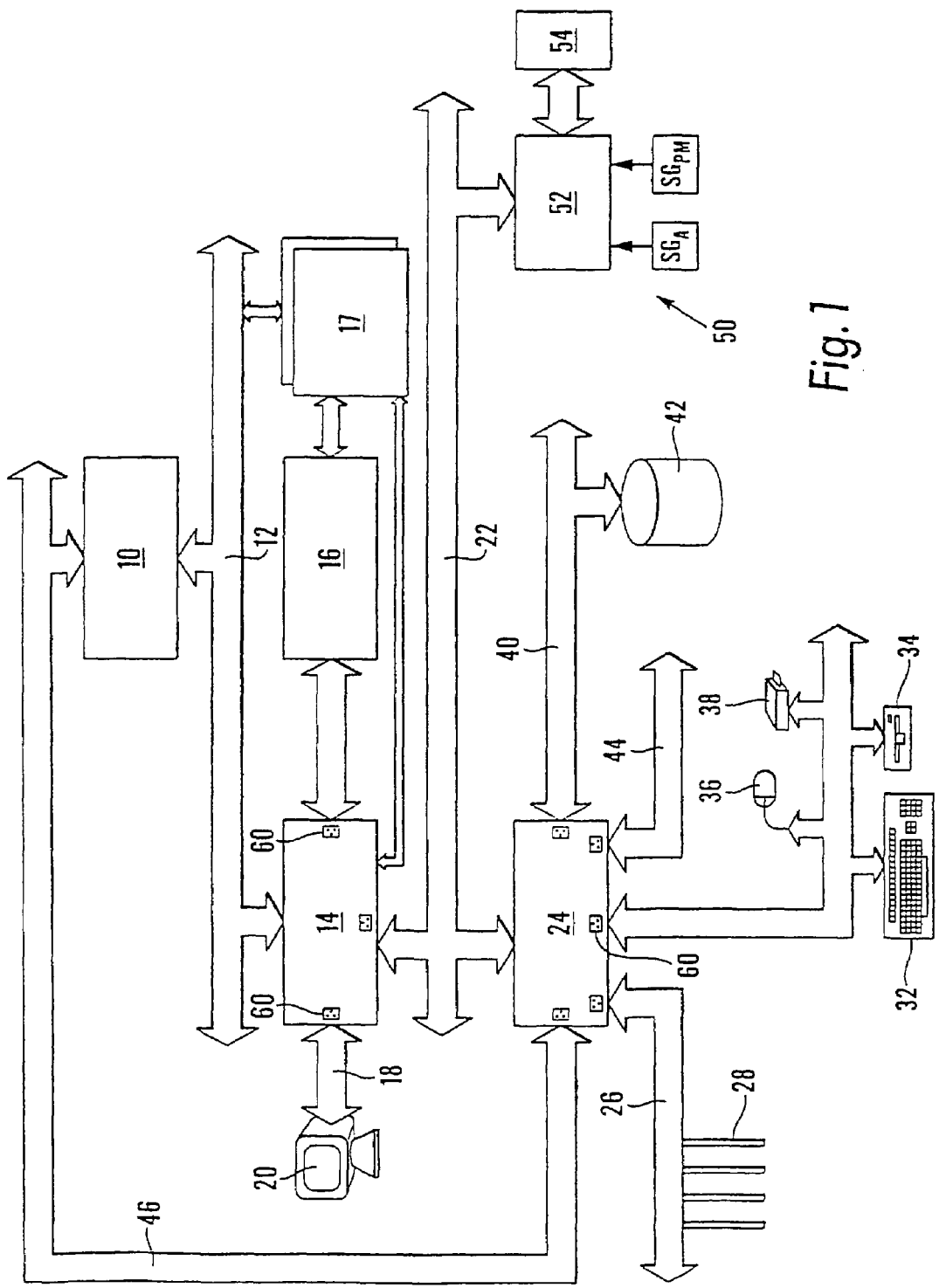

| | | |
|---|---|---|
| 5,432,950 A | 7/1995 | Sibigtroth |
| 5,434,562 A * | 7/1995 | Reardon .................... 713/200 |
| 5,469,556 A * | 11/1995 | Clifton ....................... 711/163 |
| 5,491,827 A * | 2/1996 | Holtey ....................... 711/163 |
| 5,559,993 A | 9/1996 | Elliott et al. |
| 5,764,761 A * | 6/1998 | Vicard ........................ 713/189 |
| 5,765,027 A * | 6/1998 | Wang et al. .................. 710/40 |
| 5,896,499 A * | 4/1999 | McKelvey .................. 713/201 |
| 6,732,272 B1 * | 5/2004 | Inoue et al. ................. 713/190 |
| 7,216,362 B1 * | 5/2007 | Strongin et al. .............. 726/16 |

* cited by examiner

SYSTEM FOR DATA PROCESSING A SECURITY CRITICAL ACTIVITY

TECHNICAL AREA

The present invention relates to a system for data processing a security critical activity in a secure management mode in a computer, which computer comprises a processor, handling devices, memory, storage means, hereafter named resources.

BACKGROUND OF THE INVENTION

Advances in computer and communications technology have increased the flow of information between and within computer networks. This ability to communicate between computers and networks has also made it possible to develop a wide variety of services that can be performed from your own personal computer. Such services may for example be mailing, home shopping, home banking etc. Many of these services comprise security critical activities that have to be performed when the computer is on-line, such as transferring money through Internet.

Performing such security critical activities, is of course a security risk, since also potential intruders can listen to and/or compromise these security critical activities, by breaking into the computer. One of the reasons for this is that the operating systems of personal computers were not designed with security in mind, since they were personal and without connections to any network. Thus, it is easy to use malicious code, Trojan horses or the like to compromise the operating system of a personal computer and thereby the security critical activities executed thereon. Also more secure operating systems, such as Unix, may be compromised with a relatively small effort. Today there is no commercial operating system that protects the user from Trojan horses.

To increase the security of the operating system there has been suggested to provide firewalls between the local network and the public available networks open to any intruders. Such firewalls filter the communication between the local network and the outside world by only allowing certain selected services to pass through. If other services are requested the passing through the firewall will only be enabled if a valid password is presented. The communication then eventually reaches either a personal computer or a server computer inside the local network. This safety measure will of course increase the security, but will still not guarantee that the security critical activities are performed the way the user initially intended. Vulnerabilities in the implementation of the allowed, non-filtered, services may allow an intruder to intrude into the personal computer.

Another possible security measurement is to insert security mechanisms in the operating system, like requiring passwords for access to certain services.

The main reason why the above security mechanisms are not totally safe is that the % are software based. Since software always contains bugs, it is corruptible, and may therefore be compromised by exploited security holes, malicious code, resident Trojan horse software etc. Software based security solutions are also too brittle, i.e. if the operating system security is compromised all data and all applications that are executed thereon will also be compromised.

One different, but similar approach to increase the operating system security is to build a so called multi level secure (MLS) operating system. Such systems label objects and subjects according to a security classification, and define rules for how information is allowed to flow through the system. The classification of different security levels and the record keeping of which users that have access to different security levels and objects is very time consuming to maintain. Furthermore, conventional personal computer applications are not compatible with the operating systems of the MLS system, and all applications have to be tailor-made for the MLS system. This is of course very costly.

A method for performing or executing security critical activities in a computer is disclosed in WO 98/19243 with the same inventor as for the present invention, which document is hereby incorporated for reference. The system comprises a security device to be connected to the communications means of a personal computer, like a serial port or the PCI bus. The security device comprises a processor, memory and crypto means. Certain selected IO devices of the computer, such as the screen, keyboard, mouse and smart card reader are provided with switches and crypto means. During normal activity (normal mode) the security device is not active and the computer functions as normal. The presence of the security device and the switching and crypto means are transparent to the computer.

When a security critical activity is initiated by a signal from the computer processor, the computer is switched to secure management mode. The security device gains control over the selected user IO devices through the switching and crypto means and shuts out the computer processor from access. The execution of the security critical activity is tranferred to the security device and executed there with proper user involvement. Data is protected from the computer processor during transfer between the security device and the user IO devices.

The security device must be constructed so that the execution of the security critical activity can be performed securely without any possibility for the computer processor to compromise the execution. The above described system accomplishes this by having a separate processor, separate program memory, separate data memory and several other devices and controllers separate.

Unfortunately, this is an expensive solution, since so many functional circuits need to be duplicated. It would be preferable if for example access to a part of the existing PC memory could be divided off for the security device. This would be a major cost benefit, since suitable memory circuits usually only are provided in large sizes. This would also allow for flexibility, since the security device could divide off as much memory from the large PC-memory as needed for the security activity.

There are several other resources in a PC which could be divided off from the PC's normal control and usage, for protected usage by the security device; devices in specific slots on the PCI bus or the ISA bus, whole storage devices or sectors on storage devices on a IDE bus, logical devices on an USB bus.

It is important for the security of the security device to minimize the number of hardware mechanisms both the computer processor and the security device can control, since unexpected and dangerous interactions might be performed by the computer processor. On the other hand, we clearly see the cost benefit arising from the ability for protected usage by the security device of existing PC resources. The presence of the security device should also cause minimal changes to the computer processor's normal mode, for compatibility reasons.

SUMMARY OF THE INVENTION

The object of the invention is to provide a system for performing security critical activities in a safe way according to the method described above in a cost effective way utilising many of the memory means and IO devices present in a personal computer.

According to one aspect of the invention this is achieved with a system according to the preamble, comprising a security device comprising a processor and signal generators, a number of control means, hereafter named switches, with signal receivers arranged respectively between the security device and the pre-selected resources, that the switches contain information regarding accessibility to and from the resources, or parts of the resources, hereafter named resource ranges, wherein the switch controls requests from the computer processor to the resources or resource ranges depending on the information contained in the switch, and wherein, in response to a call from the computer processor or the handling devices, the switches are activated by receiving a signal from the security device, enabling the security device access to and from the resources or resource ranges selected by the security device, and denying the computer processor access to and from the resources or resource ranges selected by the security device.

According to a further aspect of the invention it is characterised in that the information contained in the switches controls other possible processors contained in or connected to the computer.

According to another aspect of the invention, it is characterised in that the security device comprises a signal generator, wherein, when a switch receives a signal, the security device is able of altering the content of the information of that switch.

According to another aspect of the invention it is characterised in that the information in the switch enables the switch to control certain areas of the memory means are allocated to be accessed by the processor of the security device only and in that the information in the switch enables the switch to control that certain resources are accessible by the computer processor when not in secure management mode, and only accessible by the security device when in secure management mode.

According to yet an aspect of the invention it is characterised in that the switches are hardware switches.

The advantage with a system according to the invention is that security critical activities may be performed securely and utilising the existing memory and device means already present in the computer. By arranging switches at certain locations, such as connection points to different resources, the fact that the switches contain information regarding accessibility from the processors in different situations, and controlling the switches by the security device, the security device has full control over the computer when a security critical activity is to be performed. At the same time, the switches allows the computer processor to gain access to certain resources that the security device is not using. The security device can select the appropriate resources, i e activate only those switches associated with the resources that are needed for the actual operation. The control of the resources by the switches enables a configuration where certain memory areas are allocated to the security device only, by which it is ensured that no compromised data may never enter the security system.

The security device is also able of altering the information contained in the switches depending on the activities to be performed which allows for a large degree of flexibility.

By using hardware switches, the security system may be built in "from the start", i e to a large extent integrated in the hardware of the computer such as the bridges. In all a cost effective and secure system is obtained by the present invention.

These and other aspects of and advantages with the present invention will be apparent from the detailed description of an embodiment and the patent claims.

SHORT DESCRIPTION OF DRAWINGS

Figure 2:
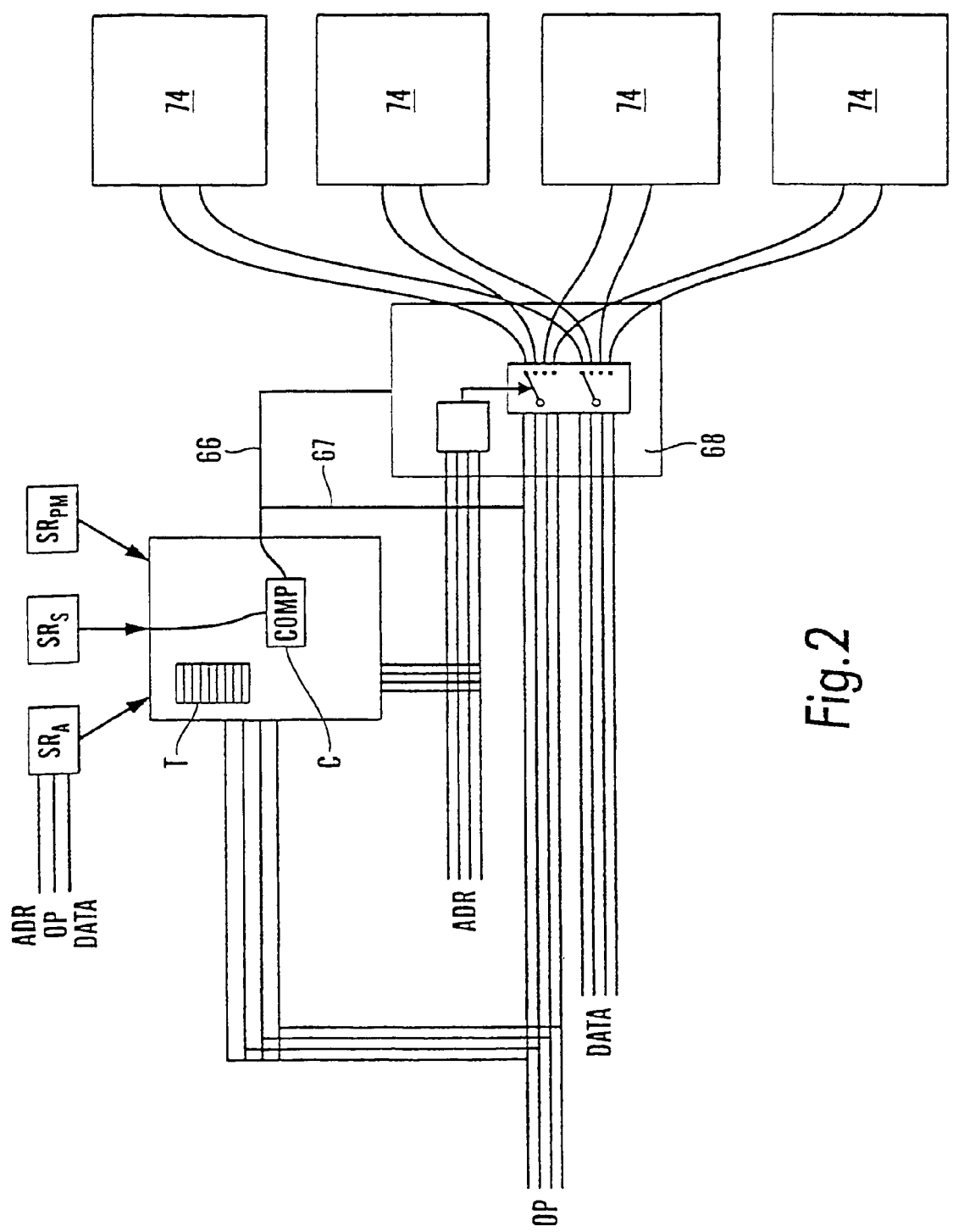
Figure 3:
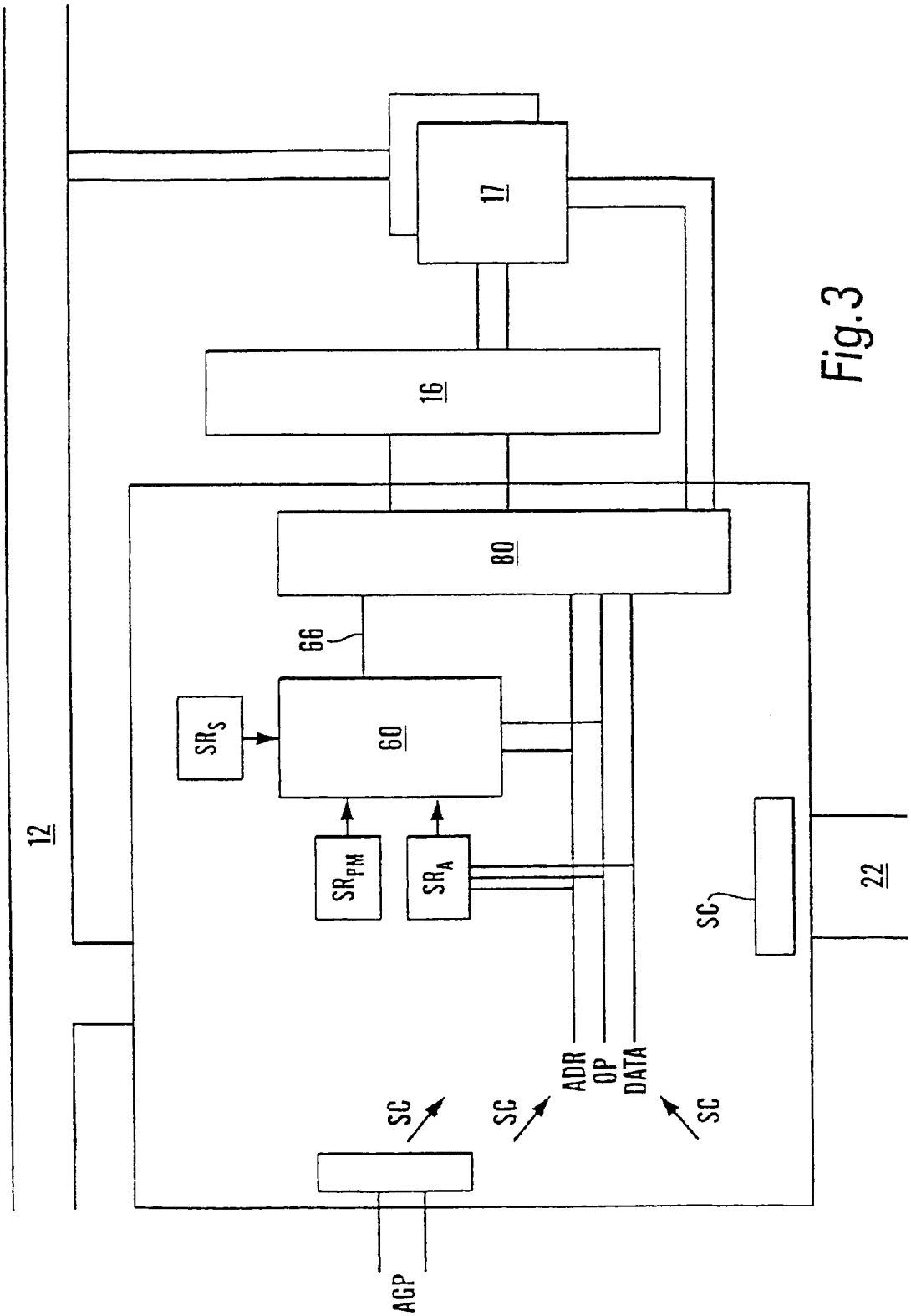
Figure 4:
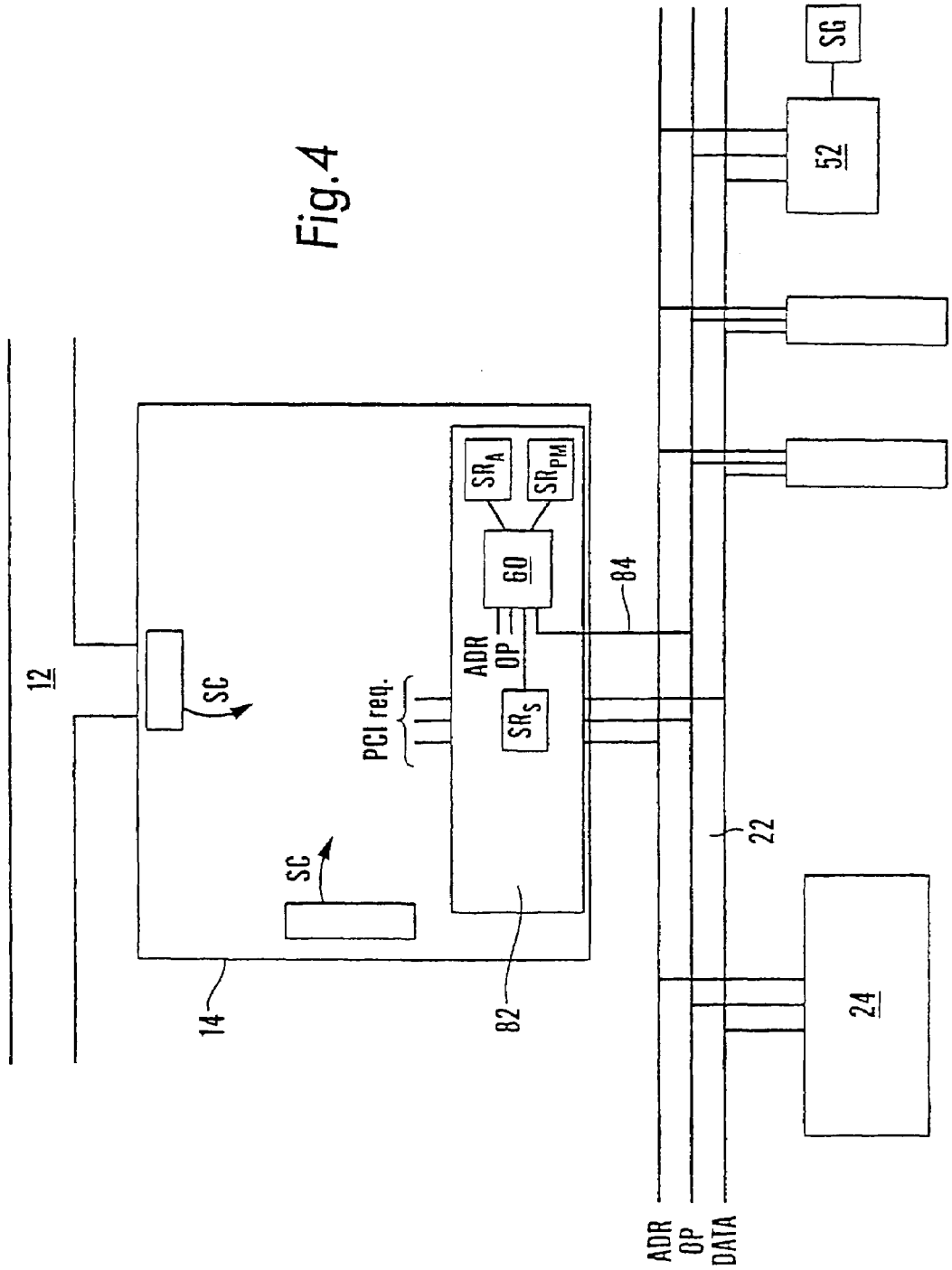
Figure 5:
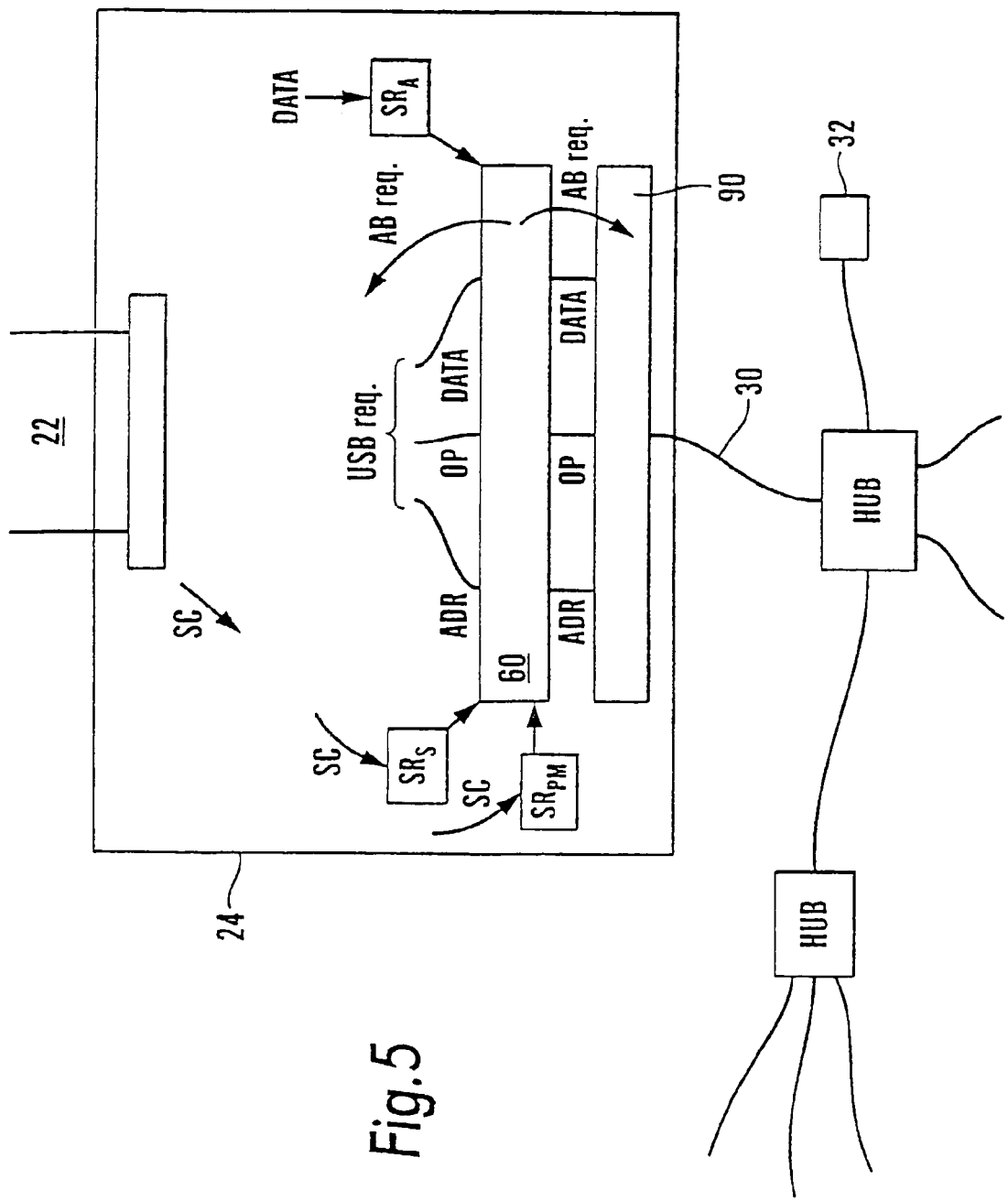

In the following detailed description of an example of an embodiment reference will be made to the accompanied drawings, in which FIG. 1 shows a block diagram of the architecture of a pentium pro computer, FIG. 2 of the configuration of a switch comprised in the system according to the invention, FIG. 3 shows an example of memory handling of a main memory in a computer according to of the invention, FIG. 4 shows an example handling a PCI bus according to the invention, and FIG. 5 shows an example of handling an USB bus according to the invention.

DETAILED DESCRIPTION OF AN EXAMPLE OF EMBODIMENT

In FIG. 1 the reference sign 10 denotes a processor unit. The processor unit is equipped with an internal cache memory in a conventional manner. In this respect it is to be noted that even though one processor unit is depicted on FIG. 1, there could be a number of processors working in parallel. The processor unit is signally connected to a host bus 12. To the host bus a Host/PCI Bridge 14 is connected, in some applications referred to as the North Bridge. In some applications it may be divided into two bridges, referred to as the compatibility and the auxiliary PCI bridges. In that respect the bridges act as intermediaries in the communication between the devices on different buses and the processor. To the Host/PCI bridge a main DRAM 16 (Dynamic Random Access Memory) is connected for temporary read/write instructions to and from the processor unit. The memory is also connected to and controlled by two Data Paths 17, which in turn are connected to the Host/PCI Bridge and the Host bus.

An AGP connection 18 (Accelerated Graphics Port) is arranged between the Host/PCI Bridge and a screen controller and a monitor 20.

A PCI Bus 22 is connected to the Host/PCI Bridge and to the PCI Bus an E/ISA Bridge 24 is connected, in some applications referred to as the South Bridge. To the E/ISA Bridge a number of different buses can be connected. In FIG. 1 are shown the ISA Bus 26 to which a number of card slots 28 are connected, which slots may be used for sound cards, network cards and the like; the USB Bus 30 to which e g keyboard 32, floppy drives 34, mouse 36 and smart card reader 38 are connected; the IDE Bus 40 to which e g hard disk drives 42 are connected, and the X Bus 44. In case of a multi processor system, i e with more than one processor, a bus 46 is also arranged between the E/ISA Bus and the processor unit, the APIC Bus (Advanced Programmable Interrupt Controller). The function of the APIC Bus is to manage interrupt requests from IO devices to the processors.

To the PCI Bridge a security device 50 is connected. The security device comprises a processor 54 capable of performing certain commands, which will be described in detail below. A ROM memory 54 is connected to the processor. The security device is further provided with signal generators $SG_A$ and $SG_{PM}$, the function of which will be explained below. At certain locations control means, hereafter named switches 60, are arranged in the hardware of the computer. According to the invention one switch is arranged at the connecting point of the main memory to the Host/PCI Bridge. Further switches may be arranged at the connection point between the bridges and the buses and/or to a number of different devices of the computer such as the graphics display card, the keyboard, the hard disk drive an such. Conveniently, the switches that are connected to different buses, may be integrated in the bridges. For instance for a hard disk drive connected to the IDE Bus, the switch is arranged on the E/ISA Bridge at the connection of the Bus.

FIG. 2 shows an example of a switch incorporated in a system. A switch 60 is connected to the address and operation lines ADR, OP of a bus. The ADR and OP lines are further connected to a "director" 68. The switch is further provided with a number signal receivers $SR_A$ (alter), $SR_S$ (source) and $SR_{PM}$ (protection mode). The function of the director and the signal receivers will be described below. An enable/abort line 66 is arranged between the switch and the director 68. The director is further connected to different resources or resource ranges 74. In this respect it is to be noted that the word resources means devices such as the hard disk, keyboard and such, and the word resource ranges means for example part of a memory.

The switch contains a table T of addresses to the different resources and a comparator C whose functions will be described below. The table also contains information regarding access to the different resources.

As an example, the resource could be a memory. If the computer is running in normal mode, the computer processor is active and the security device processor is passive, which is detected by the switch via the signal receiver $SR_S$ receiving a source signal. When the computer processor requests access to the memory, the addresses are checked by the switch and the sources of the request compared with the sources signal by the comparator C. There are then two scenarios regarding the access. Either some of the memory area, a resource range, is only allocated to the security device as specified in the table T, in which the switch then denies the computer processor access to these areas, or the computer processor could have access if in normal mode. Depending on the requests from the computer processor and the accessibility granted by the switch, data and operation signals are directed to and from the requested resource or completely denied.

If a security critical activity is ordered, and the security device requests that the system enters a secure management mode, a signal is sent by the security device from the signal generator, $SG_{PM}$ to the protection mode signal receiver $SR_{PM}$ of the switch. Depending on the information in the switch, access by the computer processor to resources controlled by the switch can be withdrawn further when entering into secure management mode. These resources will then be solely available to the security device processor, according to the information in the switch. The switch controls, in the embodiment shown in FIG. 2, the accessibility to the different sources 74 with the director 68 depending on the requests via the enable/abort line 66. In some cases, the unit requesting an operation, which is denied by the switch, needs to know that access was denied. Therefor, a line 67 is connected between the enable/abort line 66 and the operation lines so as to provide information to be sent back to the unit.

Depending on the security critical activity to be performed, the content of the table T of the switch may have to be altered. It could be either that the security device does not need a certain resource for the activity and may allow the computer processor to use it, or deny the computer processor access to a resource. In that case, a signal is sent from an Alter Signal Generator, SGA of the security device to the Alter Signal receiver, SRA of the appropriate switches, together with addresses, operations and data. It is to be understood that only the security device is able of changing the content of the switch in this way.

An example of memory access is shown in FIG. 3. Here a switch 60 is connected to the RAM controller function block 80. If in normal mode, the switch functions, according to the content of the table, so as to allow the security device processor to access the memory area allocated only to the security device while the rest of the memory area is accessible by the computer processor. Some memory area, that in normal mode is accessible by the computer processor, may be allocated to the security device processor only when in protection mode. The switch handles memory requests from different sources SC and allows or denies access according to the mode and source. As opposed to the switch of FIG. 2, no director is needed since there is only one source, the DRAM, and the switch enables or disables access via line 66.

The same general operation as described above may be obtained with other kinds of resources such as the screen controller. In normal mode the computer processor has full access to the screen controller, but may be denied access completely when in protection mode, in order to ensure that only "secure" data is shown on the screen.

In the example shown in FIG. 2 the switch is activated by physically separate signals from the $SG_{PM}$ and $SG_A$ to the $SR_{PM}$ and $SR_A$ respectively, which is easily obtainable with multi-line buses. However, physically separate signals via lines might need to be propagated between different bus types by controllers like the North and South Bridges, for example. These controllers also might need to translate the signal between different formats for different buses or packet formats. The controllers/translators are preferably arranged at the connection point between the PCI bus and the North and South bridges respectively. It is also to be understood that they could be arranged in the switches.

FIG. 4 shows an example of a switch controlling the PCI bus 22. In this case the switch is a part of the PCI controller function block 82. The switch is not placed between the requesting source and the resource. Instead it "surveys" the PCI bus. If, according to the content of the switch, a request for access to a resource is made by a source, which is not allowed, the switch generates an "illegal" signal via the line 84 to the bus, thereby denying access for that source. In the same way as above, signals are sent by the security device to the switch for entering a protection mode or altering the contents of the table of the switch.

Some devices that the security device wishes to control in protection mode may be connected to serial buses, such as keyboard, mouse, card reader and such. In those cases, depending on how the information is transmitted on the bus, the signals from the security device may be sent together with the rest of the information. If the information is sent in packages containing address, operation and data, one part of the package contains the signals to the switch. If on the other hand the information is divided into smaller packages "sub packages", i e one package containing addresses, one package containing data, and so forth, one sub package contains the signals to the switch.

FIG. 5 shows an example of a switch 60 controlling a USB bus. Here the switch is arranged between the USB requests and the USB controller function block 90. Depending on the requests from the different sources, and the content of the switch and the mode, the switch may allow access or send an abort request back to the source.

A further alternative is that a switch is arranged at the connection between for example the E/ISA Bridge and the serial bus and functioning in the way described above. In this way only one switch is necessary for controlling and enabling/disabling access to a number of devices on the bus, depending on the information contained in the switch.

The switches may also comprise crypto means for encrypting and decrypting data from and to the different devices and the processor of the security device, we will not discuss the case with the communication between the security device and a device is protected with crypto means further. Reference is made to WO 98/19243 for more information regarding this.

During normal operation the main processor has access to and communicates with most devices and memories of the computer via the different buses and bridges, i e normal mode. During normal operation, the switches control and denies access to the resources that are only allocated to the security device, as specified in the switches.

When a security critical activity is ordered, which could be initiated by the processor or an IO device, the security device is activated. Depending on the type of security critical activity, certain information and programs are transferred from the ROM of the security device to its processor to perform certain tasks before the security critical activity commences, i e putting the computer in a secure management mode. Signals from $SG_{PM}$ are then generated to those switches that are affected by the actual security critical activity.

One example is if the security critical activity requires temporary memory space, a PM-signal is sent by the security device processor to the switch arranged at the connection of the main memory. In order to ensure that information written and read in the main memory during the security critical activity is not compromised, a certain area of the main memory may be allocated to the processor of the security device only.

A further example is if the security device requires a large program or large volumes of information to perform a security critical activity. In that case a switch in the connection of for example the IDE bus may be activated. As with the main memory, certain areas of the hard disk drive may be allocated to the security device only. This measure ensures that the security device only can access and deliver data from and to that area of the hard disk drive, ensuring that the information cannot be compromised.

According to the invention switches may be built in at suitable locations and for different devices, internal as well as IO devices. The switch function may be of different types depending on the type of device and function, such as access only by the security device, as described above, access only by the computer processor or access by the security device if the computer is in the secure management mode.

It is to be noted that even though the computer processor has been mentioned above as the main source of requests to different sources, apart from the security device, there may be other processors in a modern computer since the design of the computer tends to be more and more distributed. There may for instance be PCI cards containing processors that are able of reading/writing to any part of the memory.

Also, the processor unit of the computer may comprise more than one processor, in which case it is important that a switch is located at the connection between the APIC bus and the Host/PCI bridge, since the APIC bus handles many interrupt requests.

It is therefor important that the security device is able of controlling more sources than the computer processor in order to prevent an attacker from circumvent the security system by chancing the content of the operating system of the PCI card. A function of the security device may be a plug and play function, i e the security device locates and identifies all sources connected to the computer in order to be able to control them. In this way, a distributed MMU-like function is obtained, providing a greater robustness against security loop holes. However, writing information to the switches shall still only be able to be performed by the security device processor, and allocation requests of resources have to be sent to the security device processor for approval.

In this respect it is to be noted that the information contained in the different switches, such as addresses and accessibility by which processor and in which situation is arranged depending on the actual resource-es that the actual switch controls. It is also to be noted that the security device activates different switches to different resources depending on the actual security critical activity to be performed.

It is obvious that interrupt signals generated by allocated resources are redirected by the switch to the security device processor. Support functions such as DMA functions and timers are handled in a similar way, and their operation have in some cases to be controlled by a switch function so as to prevent them from being used by the computer processor illegally. These problems are well known to a man skilled in the art.

It shall also be noted that the computer configuration described and shown is only an example. There may be a wide variety of other configurations and arrangements with the same function. In that sense it should be understood that the bridges may be one and the same, that the computer may or may not have all the different buses described, that the screen controller may be connected to the AGP, the ISA or the PCI bus, that the keyboard, floppy and mouse may be connected to other buses such as the USB.

The invention claimed is:

1. System for data processing a security critical activity in a secure management mode in a computer, the system comprising:

a computer comprising a computer processor, a computer bus, a bridge, a main memory, and a plurality of handling devices connecting to the computer processor via the bridge, the main memory being one of the plural handling devices;

a security device comprising a security device processor with a protection mode signal generator (SGpm) and an alter signal generator (SGa), the security device processor connected to the bridge;

a switch connected between the bridge and each handling device, the switch containing a table of addresses to different ones of the handling devices including parts of the handling devices, and a comparator, the table having accessibility allocations specifying handling devices or the parts thereof allocated only to the security device and allocated to the computer processor operating in a normal mode, the table of the switch being changeable only under control of signals generated by the security device; and an alter signal receiver (SRa), a source signal receiver (SRs), and a protection mode signal receiver (SRpm) connected to the switch, wherein, the switch is connected to address lines and to operation lines of the bus, the switch is configured for i) a first normal mode wherein the computer processor has access to a first group of the handling devices, and ii) a second protected mode wherein the computer processor is denied access to the first group of handling devices and the security processor is allowed access to the first group of handling devices and to execute a security critical activity with the first group of handling devices, said signals from the security device, enabling the security device and the security processor access to the handling devices and denying the computer processor access to the handling devices, changes the switch from the first normal mode into the second protection mode, and the computer processor and the security device processor are separate processors.

2. The system of claim 1, wherein to enter the secure management mode, i) the protection mode signal generator issues a request signal to the protection mode signal receiver, and ii) based on information in the table, access by the computer processor to the handling devices is withdrawn and access to the handling devices or the parts thereof is solely limited to the security device processor.

3. The system of claim 1, further comprising:
a director connected to the switch and connected to each handling device, wherein,
the director is connected to the address lines and to the operation lines of the bus.

4. The system of claim 3, wherein,
the switch further comprises an enable-abort line, and the director is connected to the switch via the enable-abort line.

5. The system of claim 1, wherein,
only the security device can change contents of the table, the security device configured so that the alter signal generator sends an alter signal to the alter signal receiver to alter the contents of the table.

6. The system of claim 1, wherein,
each handling device comprises a first part of the main memory and a second part of the main memory,
the switch is connected between the first and second parts of the main memory and the bridge,
in the normal mode, the contents of the table allows access to the first part of the main memory to the security device processor and allows access to the second part of the main memory to the computer processor, and
in the secure management mode, the contents of the table allows access to the first and second parts of the main memory to only the security device processor.

7. The system of claim 6, wherein, the switch further controls access to the second part of the main memory based on a source making the access request.

8. The system of claim 1, wherein,
each handling device comprises a screen controller of a monitor,
the switch is connected between the screen controller and the bridge,
in the normal mode, the contents of the table allows the computer processor full access, via the controller, to the monitor, and in the secure management mode, the contents of the table denies the computer processor complete access to the monitor, or parts thereof, and allows the security device processor access to a part of the monitor denied to the computer processor.

9. The system of claim 1, wherein,
each handling device is one of a part of the main memory, a hard disk, a keyboard, a monitor, a card slot, a mouse, floppy drive, and a smart card reader.

10. The system of claim 1, wherein,
there are plural bridges, and
at least one bridge is one of a Host-PCI bridge and a E-ISA bridge.

11. The system of claim 1, wherein,
the security device processor is configured to i) run the normal mode with access to a second group of the handling devices, and ii) run the security critical activity in the secure management mode with access to both the first and second groups of the handling devices, and
the switch is configured to control access to each handling device by the comparator checking an access request from the computer processor and the security device processor with the accessibility allocations in the table, a positive checking result by the comparator directing data and operation signals to and from the accessed handling device.

12. System for data processing a security critical activity in a secure management mode in a computer, the system comprising:
a computer comprising a computer processor, a bridge, and a main memory connected to the computer processor via the bridge;
a security device comprising a security device processor with a protection mode signal generator (SGpm), the security device processor connected to the bridge;
a switch connected between the bridge and the main memory, the switch containing an information table and a comparator, the table having accessibility allocations specifying parts of the main memory allocated only to the security device and other parts of the main memory allocated to the computer processor operating in a normal mode,
the table of the switch being changeable only under control of signals generated by the security device; and
signal receivers connected to the switch, wherein,
the switch is connected to address lines and to operation lines of the computer,
the switch is configured for i) a first normal mode wherein the computer processor has access to a first part of the main memory, and ii) a second protected mode wherein the computer processor is denied access to the first part of the main memory and the security processor is allowed access to the first part of the main memory and to execute a security critical activity with the first part of the main memory,
said signals from the security device, enabling the security device and the security processor access to the main memory and denying the computer processor access to the main memory, changes the switch from the first normal mode into the second protection mode, and
the computer processor and the security device processor are separate processors.

13. The system of claim 12, wherein,
the security device processor is configured to i) run the normal mode with access to a second part of the main memory, and ii) run the security critical activity in a secure management mode with access to both the first and second parts of the main memory, and the switch is configured to control access to each part of the main memory by the comparator checking an access request from the computer processor and the security device processor with the accessibility allocations in the table, a positive checking result by the comparator directing data and operation signals to and from the accessed parts of the main memory.

14. The system of claim 12, wherein, the security device processor is configured to i) run the normal mode with access to a second part of the main memory, and ii) run the security critical activity in a secure management mode with access to both the first and second parts of the main memory.

15. System for data processing a security critical activity in a secure management mode in a computer, the system comprising:

a computer comprising a computer processor, a computer bus, a main memory, a connecting element connecting the computer processor to the main memory;

a security device comprising a security device processor with a protection mode signal generator (SGpm) and an alter signal generator (SGa), the security device processor connected by the connecting element to the main memory;

a switch connected between the connecting element and the main memory, the switch containing a table and a comparator, the table having accessibility allocations for the security device and for the computer processor, the switch being changeable only under control of signals generated by the security device; and an alter signal receiver (SRa), a source signal receiver (SRs), and a protection mode signal receiver (SRpm) connected to the switch, wherein, the switch is connected to address lines and to operation lines of the bus, the switch is configured for i) a first normal mode wherein the computer processor has access to a first part of the main memory, and ii) a second protected mode wherein the computer processor is denied access to the first part of the main memory and the security processor is allowed access to the first part of the main memory to execute a security critical activity with the first part of the main memory, said signals from the security device, enabling the security device and the security processor access to the main memory and denying the computer processor access to the main memory, changes the switch from the first normal mode into the second protection mode, and the computer processor and the security device processor are separate processors.

16. The system of claim 15, wherein, there are plural connecting elements, and the switch is configured to control access to each part of the main memory by the comparator checking an access request from the computer processor and the security device processor with the accessibility allocations in the table, a positive checking result by the comparator directing data and operation signals to and from the accessed handling device.

* * * * *